United States Patent
Krause et al.

(10) Patent No.: US 8,255,245 B2
(45) Date of Patent: Aug. 28, 2012

(54) DETERMINING A VALUE FOR AN INDICATOR

(75) Inventors: Gerald Krause, Lorsch (DE); Karl-Peter Nos, Rauenberg-Malschenberg (DE)

(73) Assignee: SAP AG, Walldorf (DE)

( * ) Notice: Subject to any disclaimer, the term of this patent is extended or adjusted under 35 U.S.C. 154(b) by 1301 days.

(21) Appl. No.: 11/941,489

(22) Filed: Nov. 16, 2007

(65) Prior Publication Data

US 2009/0132304 A1    May 21, 2009

(51) Int. Cl.
*G06Q 40/00* (2006.01)
(52) U.S. Cl. .................. 705/7; 705/10; 705/11
(58) Field of Classification Search ............. 705/7, 10, 705/11
See application file for complete search history.

(56) References Cited

U.S. PATENT DOCUMENTS

| | | | | |
|---|---|---|---|---|
| 2003/0110249 A1* | 6/2003 | Buus et al. | ............ | 709/224 |
| 2004/0102926 A1* | 5/2004 | Adendorff et al. | ............ | 702/182 |
| 2005/0071737 A1* | 3/2005 | Adendorff et al. | ............ | 715/500 |

OTHER PUBLICATIONS

"Business Information Warehouse: Overview" [online]. SAP Library, 2001, [retrieved on Nov. 16, 2007]. Retrived from the internet: <URL: http://web.archive.org/web/20010124150100/help.sap.com/saphelp_bw21c/helpdata/en/b2/e50138fede083de100000098b38f8cf/ ...>.

"mySAP ERP: Features & Functions" [online]. SAP 2006, [retrieved on Nov. 16, 2007]. Retrieved from the Internet: <URL: http://web.archive.org/web/20061206225213/www.sap.com/solutions/business-suite/erp/featuresfunctions/index.epx>.

* cited by examiner

*Primary Examiner* — Nga B. Nguyen
(74) *Attorney, Agent, or Firm* — Fish & Richardson P.C.

(57) ABSTRACT

Among other disclosed subject matter, a computer-implemented method for determining a value for an indicator includes identifying an indicator for which a value is to be determined. The method includes identifying parameters to be used in determining a specific time interval for determining the value, the identified parameters including at least: (i) a first offset parameter; (ii) a second offset parameter; and (iii) a third offset parameter. The method includes determining the specific time interval using at least the identified parameters and the reference time point. The method includes determining the value for the indicator using at least the determined specific time interval. The method includes recording the determined value.

17 Claims, 6 Drawing Sheets

DETERMINING A VALUE FOR AN INDICATOR

TECHNICAL FIELD

This document relates to determining a value for an indicator.

BACKGROUND

Some computer systems are configured to evaluate indicators. Some indicators relate to the performance of a business organization, such as key performance indicators (KPIs). KPIs can be used by companies involved in manufacturing or selling goods, or in providing services, to name just a few examples. In business, KPIs can relate to many different topics, such as revenue, profits and capacity. When a KPI is evaluated, the result can be output to a user, which gives the user an understanding of that aspect of the company's business. There can be provided a comparison between the actual KPI value and a reference KPI value such as a budget or target value. This can give the user a basis for evaluating the KPI value, for example to decide whether any measures should be taken in the business organization in an effort to change the KPI value.

Some indicators such as KPIs are evaluated relative to time dependent data. Revenue and profit can be calculated on a monthly, quarterly or financial-year basis, to name a few examples. The system can be configured to define the time period, as the context for evaluating the KPI.

SUMMARY

The invention relates to determining a value for an indicator.

In a first aspect, a computer-implemented method for determining a value for an indicator includes identifying an indicator for which a value is to be determined. The method includes identifying parameters to be used in determining a specific time interval for determining the value, the identified parameters including at least: (i) a first offset parameter defining a time offset from a reference time point that is expressed in a time unit; (ii) a second offset parameter defining a time offset from a first time point determined using the first offset parameter, the second offset parameter configured to be expressed in one of the time unit and a superordinate time unit that is superordinate to the time unit; and (iii) a third offset parameter defining a time offset from a second time point determined using the second offset parameter. The method includes determining the specific time interval using at least the identified parameters and the reference time point. The method includes determining the value for the indicator using at least the determined specific time interval. The method includes recording the determined value.

Implementations can include any, all or none of the following features. The indicator can include a key performance indicator defined as a quantifiable factor of business performance, the determined value reflecting the business performance. The value can be determined using an electronic report that is dynamically updated with business information. The method can further include monitoring the key performance indicator by comparing the determined value with a reference value; and recording or outputting a result of the monitoring. The time unit and the superordinate time unit can be selected from the group consisting of: a fraction of a second, a second, a minute, an hour, a day, a week, a month, a year, a decade, a century, a millennium, fiscal period, fiscal year and combinations thereof. At least one of the identified parameters can be zero. The specific time interval can be defined by end points, and the end points can be equal to each other and wherein the specific time interval comprises a single point in time. The method can further include identifying a system date that is to be a basis for determining the value; and obtaining the reference time point by converting the system date to the time unit. The second offset parameter can be expressed in the time unit, and the method can further include determining the first time point by adjusting the reference time point using the first offset parameter; determining the second time point by adjusting the first time point using the second offset parameter; and determining a third time point by adjusting the second time point using the third offset parameter; wherein the specific time interval is determined using at least the determined first, second and third time points. The specific time interval can be defined by end points, and the method can further include determining the first, second and third time points for each of the end points, wherein at least one of the first, second and third offset parameters is different compared to the determination for the other end point; wherein the specific time interval is determined using at least the determined first, second and third time points for each of the end points. The second offset parameter can be expressed in the superordinate time unit and the identified parameters can include also an index parameter defining a value for the time unit relative to the superordinate time unit, and the method can further include determining the first time point by adjusting the reference time point using the first offset parameter; converting the determined first time point from the time unit to the superordinate time unit; determining the second time point expressed in the superordinate time unit by adjusting the first time point expressed in the superordinate time unit using the second offset parameter; determining the second time point expressed in the time unit by adjusting the second time point expressed in the superordinate time unit using the index parameter; determining a third time point by adjusting the determined second time point expressed in the time unit using the third offset parameter; wherein the specific time interval is determined using at least the determined first, second and third time points. The specific time interval can be defined by end points, and the method can further include determining the first, second and third time points for each of the end points; wherein the specific time interval is determined using at least the determined first, second and third time points for each of the end points.

In a second aspect, a computer program product is tangibly embodied in a computer-readable storage medium and includes instructions that when executed by a processor perform a method for determining a value for an indicator. The method includes identifying an indicator for which a value is to be determined. The method includes identifying parameters to be used in determining a specific time interval for determining the value, the identified parameters including at least: (i) a first offset parameter defining a time offset from a reference time point that is expressed in a time unit; (ii) a second offset parameter defining a time offset from a first time point determined using the first offset parameter, the second offset parameter configured to be expressed in one of the time unit and a superordinate time unit that is superordinate to the time unit; and (iii) a third offset parameter defining a time offset from a second time point determined using the second offset parameter. The method includes determining the specific time interval using at least the identified parameters and the reference time point. The method includes determining the value for the indicator using at least the determined specific time interval. The method includes recording the determined value.

In a third aspect, a computer-implemented method for creating an indicator includes storing a definition of an indicator, the definition specifying how to determine a value for the indicator using a specific time interval. The method includes storing, in association with the definition, parameters to be used in determining the specific time interval, the stored parameters including at least: (i) a first offset parameter defining a time offset from a reference time point that is expressed in a time unit; (ii) a second offset parameter defining a time offset from a first time point determined using the first offset parameter, the second offset parameter configured to be expressed in one of the time unit and a superordinate time unit that is superordinate to the time unit; and (iii) a third offset parameter defining a time offset from a second time point determined using the second offset parameter. The method includes implementing the indicator for evaluation such that upon the evaluation the specific time interval is determined using at least the stored parameters and the reference time point, and the value for the indicator is determined according to the definition using at least the determined specific time interval.

Implementations can include any, all or none of the following features. The stored parameters can further include: (iv) an index parameter defining a value for the time unit relative to the superordinate time unit, the index parameter configured for use in determining the second time point expressed in the time unit by adjusting the second time point expressed in the superordinate time unit. The indicator can include a key performance indicator defined as a quantifiable factor of business performance, the value to reflect the business performance, and the method can further include providing, before the definition is associated with the stored parameters, a user-selectable input control wherein a user involved in implementing the indicator can choose between respective sets of stored parameters; receiving a user input made using the input control, the user input indicating that the user selects the stored parameters among the sets of stored parameters; and generating the association between the selected stored parameters and the definition using the received user input.

In a fourth aspect, a computer program product is tangibly embodied in a computer-readable storage medium and includes instructions that when executed by a processor perform a method for defining an indicator. The method includes storing a definition of an indicator, the definition specifying how to determine a value for the indicator using a specific time interval. The method includes storing, in association with the definition, parameters to be used in determining the specific time interval, the stored parameters including at least: (i) a first offset parameter defining a time offset from a reference time point that is expressed in a time unit; (ii) a second offset parameter defining a time offset from a first time point determined using the first offset parameter, the second offset parameter configured to be expressed in one of the time unit and a superordinate time unit that is superordinate to the time unit; and (iii) a third offset parameter defining a time offset from a second time point determined using the second offset parameter. The method includes implementing the indicator for evaluation such that upon the evaluation the specific time interval is determined using at least the stored parameters and the reference time point, and the value for the indicator is determined according to the definition using at least the determined specific time interval.

Advantages of implementations can include any, all or none of the following. An improved way of defining time intervals can be provided. Time intervals can be defined in a more flexible and generic way. Evaluation of indicators based on defined time intervals can be improved.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
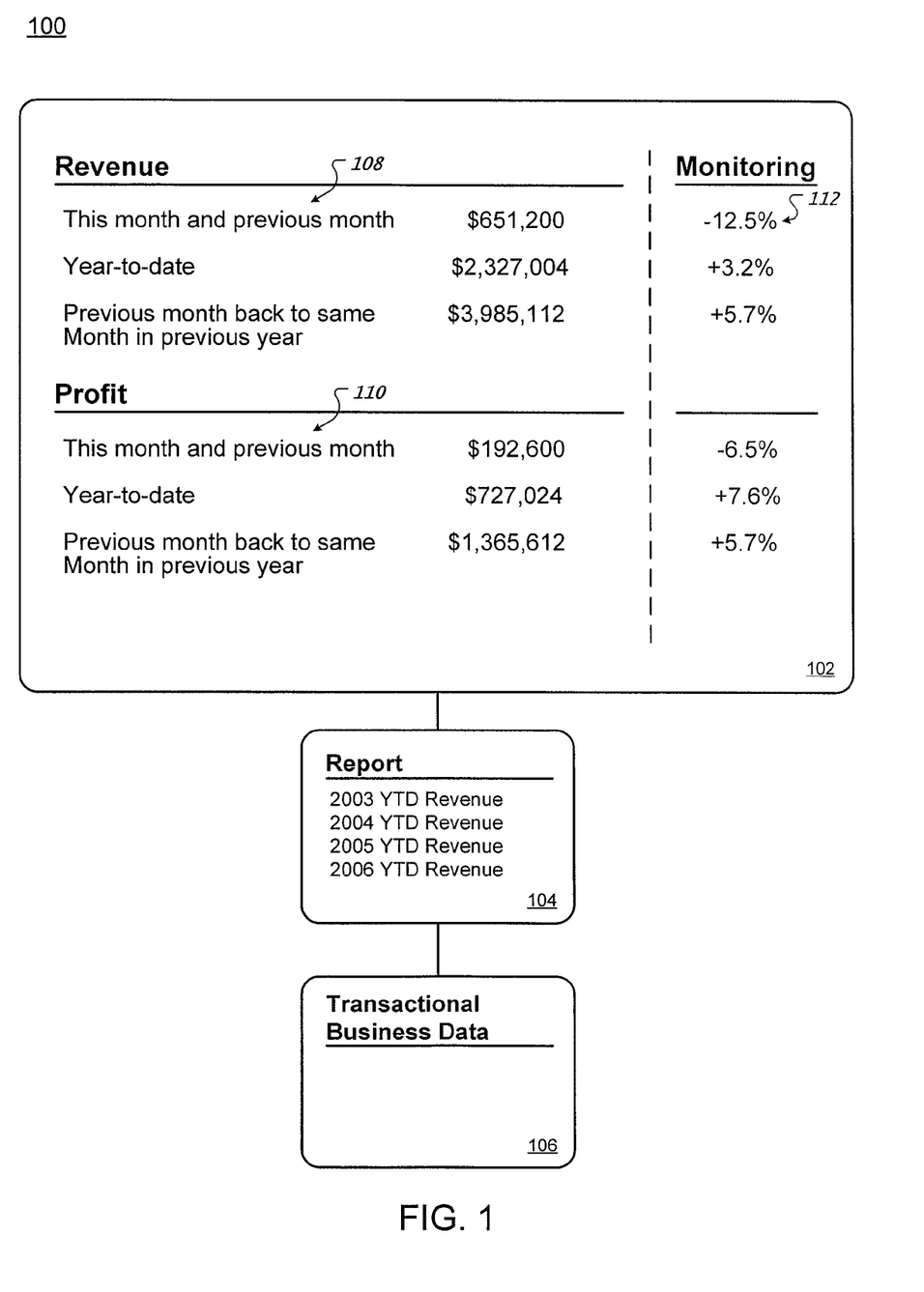
FIG. 1 is an exemplary system used to display an evaluation of an indicator.

FIG. 1 is an exemplary system 100 used to perform, and display, an evaluation of an indicator. The system 100 can include a graphical user interface 102, a report 104, and transactional business data 106, among other components not shown here for clarity. Stated briefly, information from the business data will be used in generating one or more reports, and contents of a report can be the basis for evaluating an indicator such as a key performance indicator. Key performance indicators can include metrics to quantify the objectives of an organization. These indicators can be measured against a benchmark, or business goal. Examples of transactional business data 106 include database information, updates or changes, messages, actions, or combinations thereof. The business data can relate to, and be generated in the operation of, an organization such as a company that sells products or services. Transactional business data 106 can be stored, for example, in a data warehouse, database, or combinations thereof. Because transactional business data 106 can be the foundational source of data for one or more receiving systems, the systems used to maintain transactional business data 106 can be designed with backup and recovery features. Transactional business data 106 can provide a source of data used to generate information for the report 104.

The creation of one or more reports 104 from transactional business data 106 can involve interrogating or analyzing the transactional business data 106. Reports 104 can include information on revenue, sales and/or costs, to name a few examples.

Graphical user interface 102 can provide a framework or container for presenting information to a user. In some implementations, the graphical user interface 102 can assist the system 100 with presenting report data 104 in a format specified by a system or user. Examples of optional graphical user interface 102 components (not shown in FIG. 1 for simplicity) may include: windows, menus, buttons, check boxes, and icons.

Graphical user interface 102 can include one or more revenue indicators 108 and/or one or more profit indicators 110.

Revenue can be defined as the amount of money received, which can be derived from transactional business data 106. The presented revenue indicators 108 in this example are presented to a user as a dollar figure calculated from revenue information included in the report 104, which can be derived from transactional business data 106.

Profit can generally be calculated as the difference between costs and revenue. Profit is an example of information presented by the graphical user interface 102. Profit indicators 110 can be presented using calculated profit information derived from the report 104. In this example, profit indicators 110 can be presented to a user as a dollar figure.

Indicators can be evaluated over a specified time interval or at a specified point in time. Here, the first of the revenue indicators 108 is evaluated for "this month and previous month", the next one for "year-to-date" and the third one for "previous month back to same month in previous year". In this example, the profit indicators 110 are evaluated for the same respective time intervals as the revenue indicators 108.

The system 100 can include a function, for example a monitoring application, to observe changes to system information, to evaluate system information, and/or to become aware of changes to the state of the system 100. One or more monitoring indicators 112 can be presented in the graphical user interface 102. The first monitoring indicator 112 in this example relates to the revenue indicator 108 evaluated for this month and previous month. The monitoring indicator 112 can be calculated, for example, by comparing the value of the particular revenue indicator 108 to a corresponding value for that revenue indicator 108 from an earlier time period, and can be presented in the graphical user interface 102 as a numerical percentage showing an increase or decrease.

Other kinds of information the graphical user interface 102 can present include revenue forecast information, profit forecast information, sale information, or sales forecast information, to name a few examples.

Revenue indicators 108 may be evaluated over a starting and ending date range. Moreover, the method for calculating the presented information can be complex. However, the graphical user interface 102 may present information in a format that can be understandable to a user, for example using revenue indicators 108.

Figure 2:
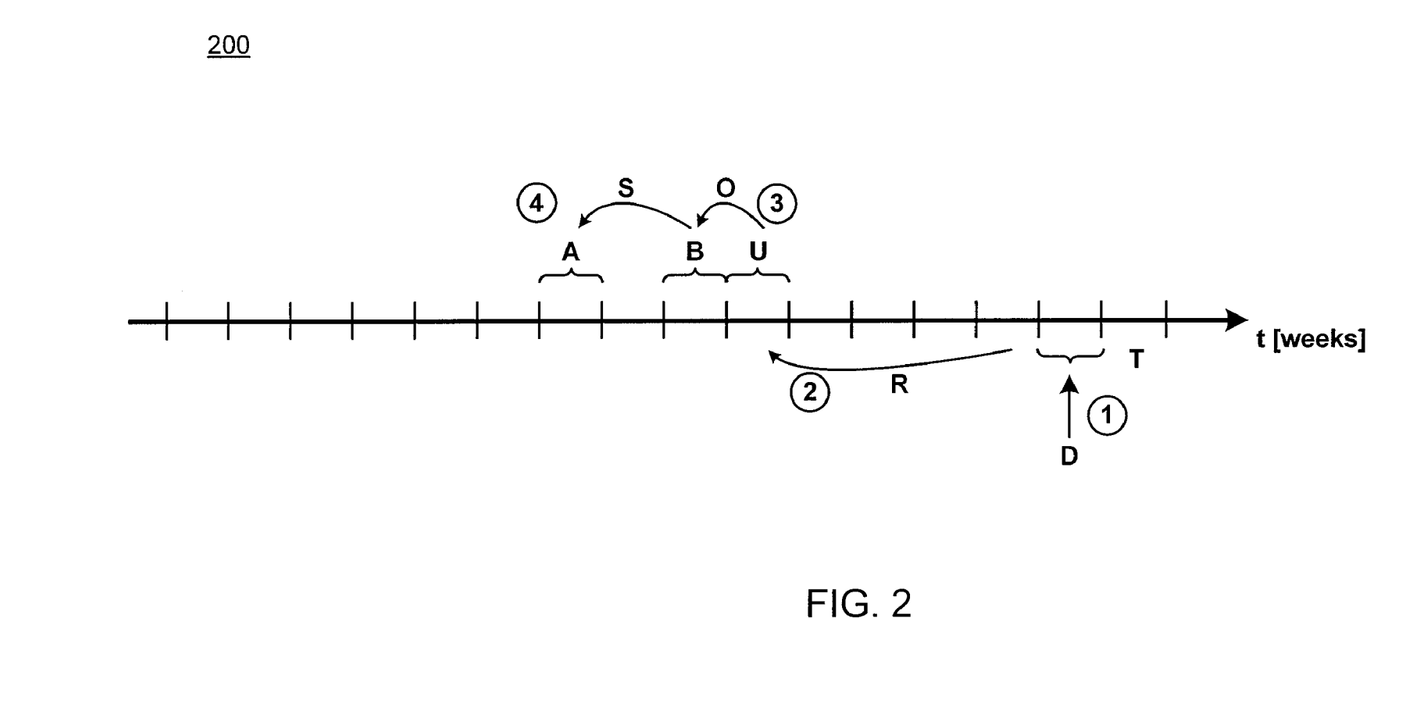
FIG. 2 is an example timeline showing calculation of a point in time.

FIG. 2 is an example timeline 200 schematically showing calculation of a point in time. The timeline 200 here illustrates exemplary steps that can be used to calculate time periods for value determinations of key performance indicators. In this example, the parameters involved in the calculation of time periods have been named T, R, O and S. The parameter T can be defined as a reference time point to be determined from a system or predefined time point D. The parameter R can be defined as an offset from any time point T to a time point U. The parameter O can be defined as an offset from any time point U to a time point B, as depicted for timeline 200. The parameter S can be defined as an offset to determine point A by shifting B. The time point B can be used as the final calculated time point, or it can be adjusted by a parameter A.

The calculated time point (e.g., B or A), can be used in defining the respective start and end points of a time interval, in a time unit that will here be referred to as TU. That is, end points X and Y can be calculated, each involving use of some or all of the parameters mentioned above. In some implementations, a single time point can be requested, and X and Y can then be equal.

The following example relates to an indicator that is to be evaluated for "this month and previous month". The semantic description "this month and previous month" for the indicator is here a user friendly description for a more complex set of calculations and parameters. Using this example, and referring now to FIG. 2, if the indicator is evaluated on Mar. 31, 2006, this means that D will have the value "31.3.2006". Assume that the time unit (TU) is month. To determine the reference time T in units of TU for any date D, an auxiliary function may be used to map from D to T. T can be calculated in real time using the system date and time D. The system date and time may increment following various computer system frequencies, for example, by increments every fraction of a second or less frequently.

To calculate values for any interval [X,Y], the values for T, R, O and S (FIG. 2) can be used. In some implementations, values for R, O and S can be provided by another system or user. For example, these values may be obtained by performing a database table lookup. For the specifics of this example, some parameters have the following values for start point X: T can be calculated as "3.2006"; R can be 0 (zero); O can be −1; and S can be 0 (zero). For the specifics of this example, some parameters have the following values for end point Y: T can be calculated as "3.2006"; R can be 0 (zero); O can be 0 (zero); and S can be 0 (zero).

Example calculations of time intervals can be performed as illustrated by FIG. 2 steps 1-4 to calculate the values for T, U, B, and A, for determining respective values of the start time point X and the end point Y. For example, step 1 in the timeline 200 for calculating start point X is here to determine T. In the example "this month and previous month", with a time unit measure (TU) of month, and a current system date D of 31.3.2006 (Mar. 3, 2006), the reference time T can have a value of "3.2006". Step 2 is here to calculate the value of U using the value of R. R is an offset in units of TU to determine point U by shifting T to U. U in this example can be calculated as "3.2006". Step 3 is here to calculate the value of B from U, using the offset O. B can be calculated by subtracting 1 from the month value of U, in this example resulting in "2.2006". Step 4, is here to calculate the value of A from the previously calculated value of B, using the offset S, resulting in "2.2006". Thus, "2.2006" is the calculated value for X.

The timeline 200 can calculate a time point Y (end point) for the interval [X,Y] by performing the steps 1-4 as illustrated by FIG. 2. For example, step 1 for calculating end point Y is here to determine T. In the example "this month and previous month", with a time unit measure (TU) of month, and a current system date D of 31.3.2006 (Mar. 3, 2006), the reference time T can have a value of "3.2006". Step 2 is here to calculate the value of U using the value of offset R. U in this example can be calculated as "3.2006". Step 3 is here to calculate the value of B from U, using the offset O. B can be calculated by subtracting 0 (zero) from the month value of U, in this example resulting in "3.2006". Step 4, is here to calculate the value of A from the previously calculated value of B, using the offset S, resulting in "3.2006". Thus, "3.2006" is the calculated value for Y. This means that the interval [X,Y] here corresponds to 2.2006-3.2006, or in other words, February-March, 2006.

Figure 3:
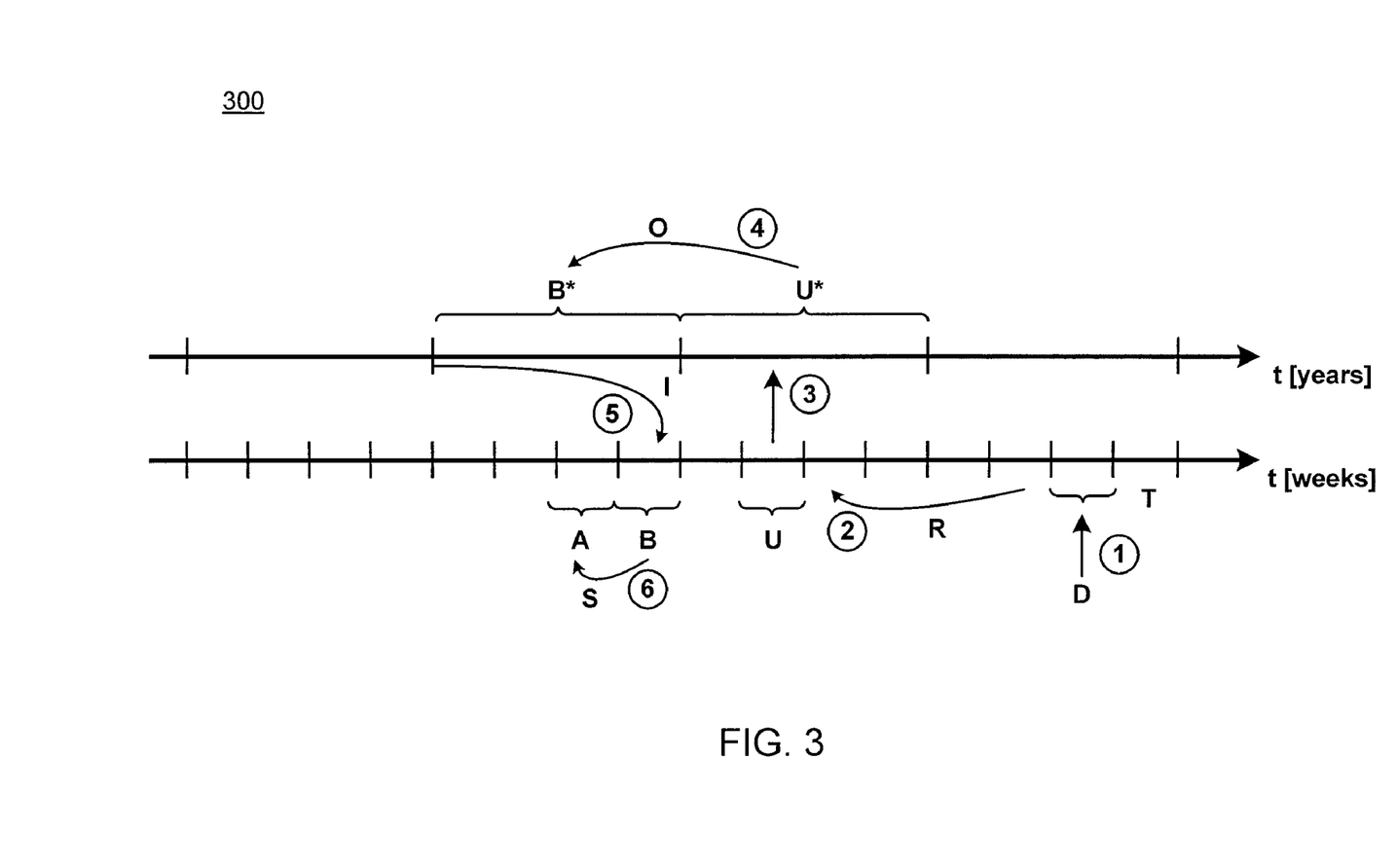
FIG. 3 is an example timeline showing calculation of a point in time determined with a value expressed in a superordinate time unit.

FIG. 3 is an example timeline 300 showing calculation of a point in time determined with one or more values expressed in a superordinate time unit. The timeline 300 here illustrates exemplary steps that can be used to calculate time periods for value determinations of key performance indicators. In this example, the parameters involved in the calculation of time periods have been named T, R, U*, O, I, and S. The parameters T, R, O and S can be as described previously for FIG. 2. The parameter U* can be defined as an offset value derived from a mapping of U in terms of the superordinate time unit SU. The parameter I can be defined as an index used to determine the value of B.

The time unit TU can be any of many different units. For example, TU can be any of a fraction of a second, a second, a minute, an hour, a day, a week, a month, a year, a decade, a century, a millennium, and combinations thereof. The superordinate time unit SU, in turn, can be any unit that is superordinate to a TU. For example, an hour is superordinate to a minute and a year is superordinate to a week.

The following example relates to an indicator that is to be evaluated for "year-to-date". The semantic description "year-to-date" for the indicator is here a user friendly description for a more complex set of calculations and parameters. Using this example, and referring now to FIG. 3, if the indicator is evaluated on the calendar date "31.3.2006", this means that D will have this value. Assume that the time unit is day. Assume that the superordinate time unit is year. To determine the reference time T in units of TU (not shown in FIG. 3) for any date D, the auxiliary function may be used to map from D to T.

To calculate values for any interval [X,Y], the values for T, R, O, and S (FIG. 3) can be used. In some implementations, values for R, O and S can be provided by another system or user. For example, these values may be obtained by performing a database table lookup. For the specifics of this example, some parameters have the following values for start point X: R can be 0 (zero); O can be 0 (zero); and S can be 0 (zero). For the specifics of this example, some parameters have the following values for end point Y: R can be 0 (zero); O can be 0 (zero); and S can be 0 (zero).

Example calculations of time intervals can be performed as illustrated by FIG. 3 steps 1-6 to calculate the values for T, U, U*, B*, and I for determining the time point X (start point). For example, step 1 in the timeline 300 for calculating X is here to determine T. In the example "year-to-date", with a time unit measure (TU) of day, a superordinate time unit measure (SU) of year, and a current system date D of "31.3.2006" (Mar. 3, 2006), the reference time T can have a value of "31.3.2006". Step 2 is here to calculate the value of U, using the value of R. R is an offset in units of TU to determine point U by shifting T to U. U in this example can be calculated as "31.3.2006". Step 3 is here to provide a mapping from U to U* in the superordinate time unit SU. U* in this example can be calculated as "2006". Step 4 is here to calculate the value of B*, using the offset O. O is an offset in units of SU. B* can be calculated as "2006". The parameter I has here been set to "first", a value that relates to the superordinate time unit SU which in this example is "year". Thus, the parameter I here means "the first day of the year. In step 5, B can therefore be calculated using the previously calculated value of B*, in this example resulting in "1.1.2006". In step 6, the offset S can be used to calculate A using the previously calculated value of B, resulting in "1.1.2006". Thus, "1.1.2006" is the calculated value for X.

The timeline 300 can calculate a time point Y (end point) for the interval [X,Y], as illustrated by FIG. 3 steps 1-4 to calculate the values for T, U, B, and A, for determining the end point Y. For example, step 1 in the timeline 300 for calculating X is here to determine T. In the example "year-to-date", with a time unit measure (TU) of day, and a current system date D of 31.3.2006 (Mar. 3, 2006), the reference time T can have a value of 31.3.2006. Step 2 is here to calculate the value of U, using the value of R. R is an offset in units of TU to determine point U by shifting T to U. U in this example can be calculated as "31.3.2006". Step 3 is here to calculate the value of B from U, using the offset O. B can be calculated by subtracting 0 (zero) from the day value of U, resulting in "31.3.2006". Step 4 is here to calculate the value of A from the previously calculated value of B, using the offset S, resulting in "31.3.2006". Thus, "31.3.2006" is the calculated value for Y. This means that the interval [X,Y] here corresponds to 1.1.2006-31.3.2006.

The example timelines depicted for FIG. 2 and FIG. 3 show just one implementation of interval determinations using an example calendar measured in units of date and time. Intervals can be determined for other types of calendars. In another implementation, a fiscal calendar may be used, for example measured in units including fiscal period, fiscal month, or fiscal year. Other examples of calendars can include a payroll calendar or factory calendar, measured in these or some other units.

Figure 4:
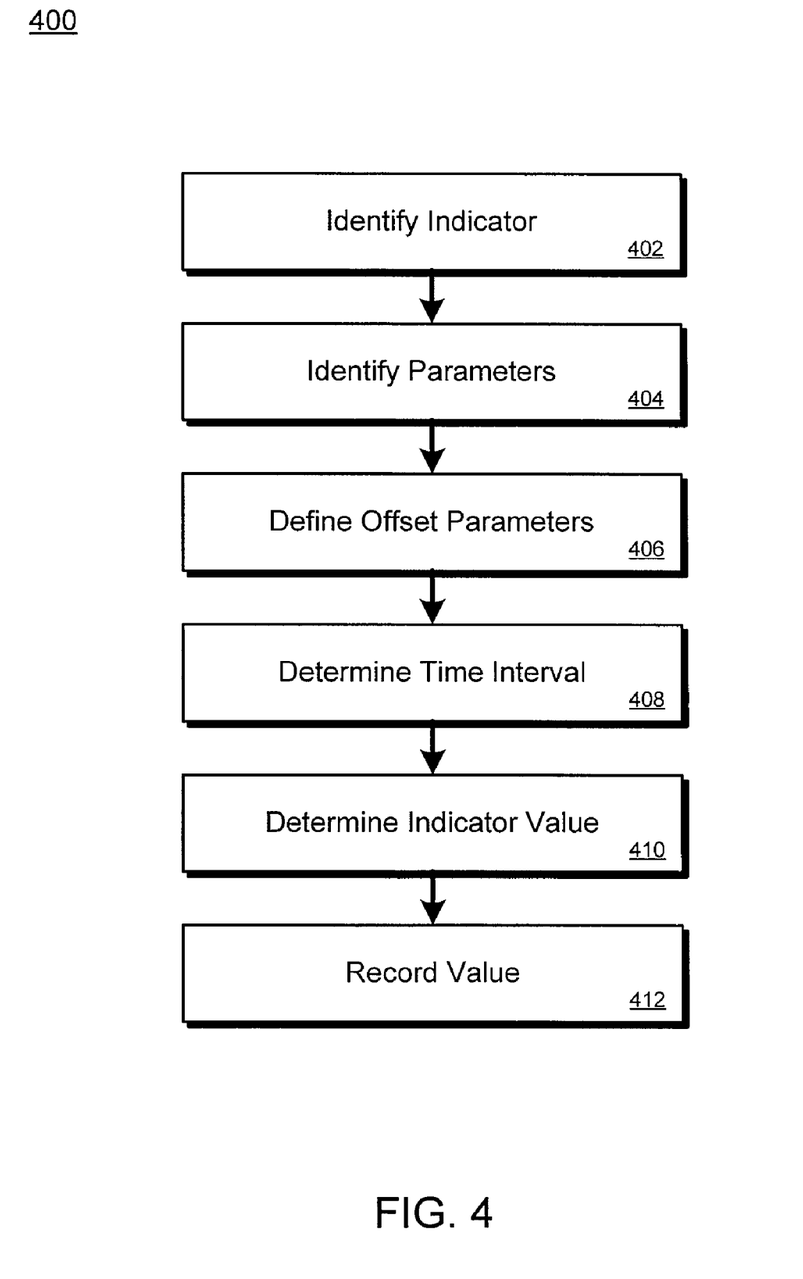
FIG. 4 is a flowchart for a method that can be performed to determine a value of an indicator.

FIG. 4 is a flowchart for a method 400 that can be performed to determine a value of an indicator. For example, the process 400 can be performed by a processor executing instructions stored in a computer-readable storage medium. The method 400 may retrieve indicators, for example, from a table of indicator descriptions visible to a user, which can facilitate a simplified view of the query name or formula.

At step 402, one or more indicators can be identified for calculation. In some implementations, a computer system can be configured to present one or more indicators as a screen in a graphical user interface, and one or more indicators can be identified as needing calculation when the system prepares to generate the screen. In other implementations, a computer system can retrieve indicators as a response to a request from another computer system component. At step 404, parameters can be identified. In some implementations, parameters can include the parameters involved in the calculation of time periods, for example, time unit TU, the optional superordinate time unit SU, and the reference time point T, in units of TU or SU. Examples of these parameters are described previously for FIG. 3. Parameters can be stored in a database or a table or in any other computer-readable format. The parameters can be stored so that they are associated with a natural-language description of the time interval to which they relate, for example "this year and the previous year".

At step 406, offset parameters can be defined. The parameters can be defined ahead of time so that they are available at runtime. For example, the definition step 406 can be performed before step 402 and/or before step 404. In some implementations, offset parameters can include the parameters involved in the calculation of time periods, for example, T, R, O, and S, described earlier, and in more detail, for FIG. 3. Referring now to FIG. 3, R can be an offset in units of TU, used to determine point U by shifting T. O can be an offset used to determine the point B from U, either in units of TU or in units of an optional SU. If the offset is specified for SU, an additional index I to determine point B can be specified. I specifies which value for TU after the shift in SU is used. Example values for I can include first, second, third, last, and unchanged. An offset S in units of TU can be used to determine point A by shifting B. A can be described as B+S.

At Step 408, a time interval can be determined. Examples of time intervals can include: Previous Month; and First 2 weeks in Previous Month, to name a few. In some implementations, including the example implementations described for FIG. 2 and FIG. 3, calculating the example time intervals can include the use of methods, functions, and/or applications to calculate time intervals with parameters and requirements that can be more complex than their respective semantic descriptions of "Previous Month" or "First 2 weeks in Previous Month". For example, determining the interval in step 408 can result in any of the values for [X,Y] described in earlier examples.

At Step 410, an indicator value can be determined. Indicators can be defined relating to any of many different topics, such as sales, revenue, profits, costs, productivity, efficiency, and availability, to name just a few examples. Using the time interval determined at step 408, an indicator value can be calculated at step 410 using the parameters included as part of the indicator definition. In the example implementation depicted in FIG. 1, the indicator value can be determined at the request of a user, through the user of a graphical user interface 102. In other implementations, the indicator value can be calculated at a pre-determined schedule, and displayed to a user through a graphical user interface 102.

At Step 412, an indicator value can be recorded. For example, an indicator value may be recorded in a database, in a file, or output to a graphical user interface.

Figure 5:
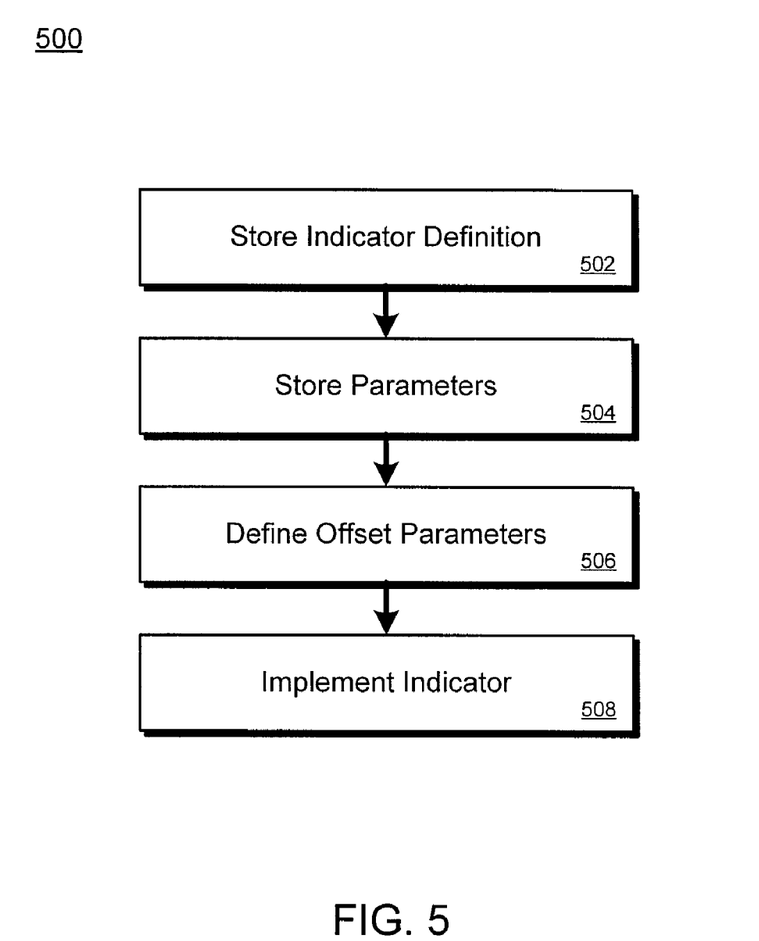
FIG. 5 is a flowchart for a method that can be performed to create an indicator.

FIG. 5 is a flowchart for a method 500 that can be performed to create an indicator. For example, the method 500 can be performed by a processor executing instructions stored in a computer-readable storage medium. Indicators can be created by defining the necessary parameters and information needed for evaluating the indicator. Parameters included in the definition of an indicator can include one or more offset parameters. A first offset parameter can define a time offset from a reference time point expressed in a time unit. A second offset parameter defining a time point can be calculated using the calculated first offset parameter, expressed in a superordinate time unit. A third offset parameter can define a time offset from a second time point determined from a second offset parameter. As described in FIG. 2 and FIG. 3, the specific time interval can be determined using the reference time point and the parameters described previously. In step 502, the definition for the indicator that uses these parameters can be stored. Storing the indicator definition can include providing a system with instructions for determining a value for an indicator. For example, the definition can state how to calculate revenue or profit, in some implementations specified during the creation of an indicator.

Parameters can be stored at step 504 when, for example, a systems administrator creates a definition of an indicator 108. As described for FIG. 1, the indicator 108 can include a description visible in a graphical user interface 102. The description, parameters for determining a time interval, and other information can be stored at step 504 in a computer system database, file system, or other type of storage medium. At step 506, offset parameters can be defined. Offset parameters can include first, second, and third offset parameters as described in examples above. In some implementations, a systems administrator may determine values for the offset parameters to create the desired indicator definition. The time units TU and/or the superordinate time unit SU, described previously and depicted in the timelines for FIG. 2 and FIG. 3, can be defined, for example, by a systems administrator.

At step 508, the indicator can be implemented. In some implementations, the indicator can be implemented visually, through the use of a graphical user interface, such as the graphical user interface 102 depicted in FIG. 1.

Figure 6:
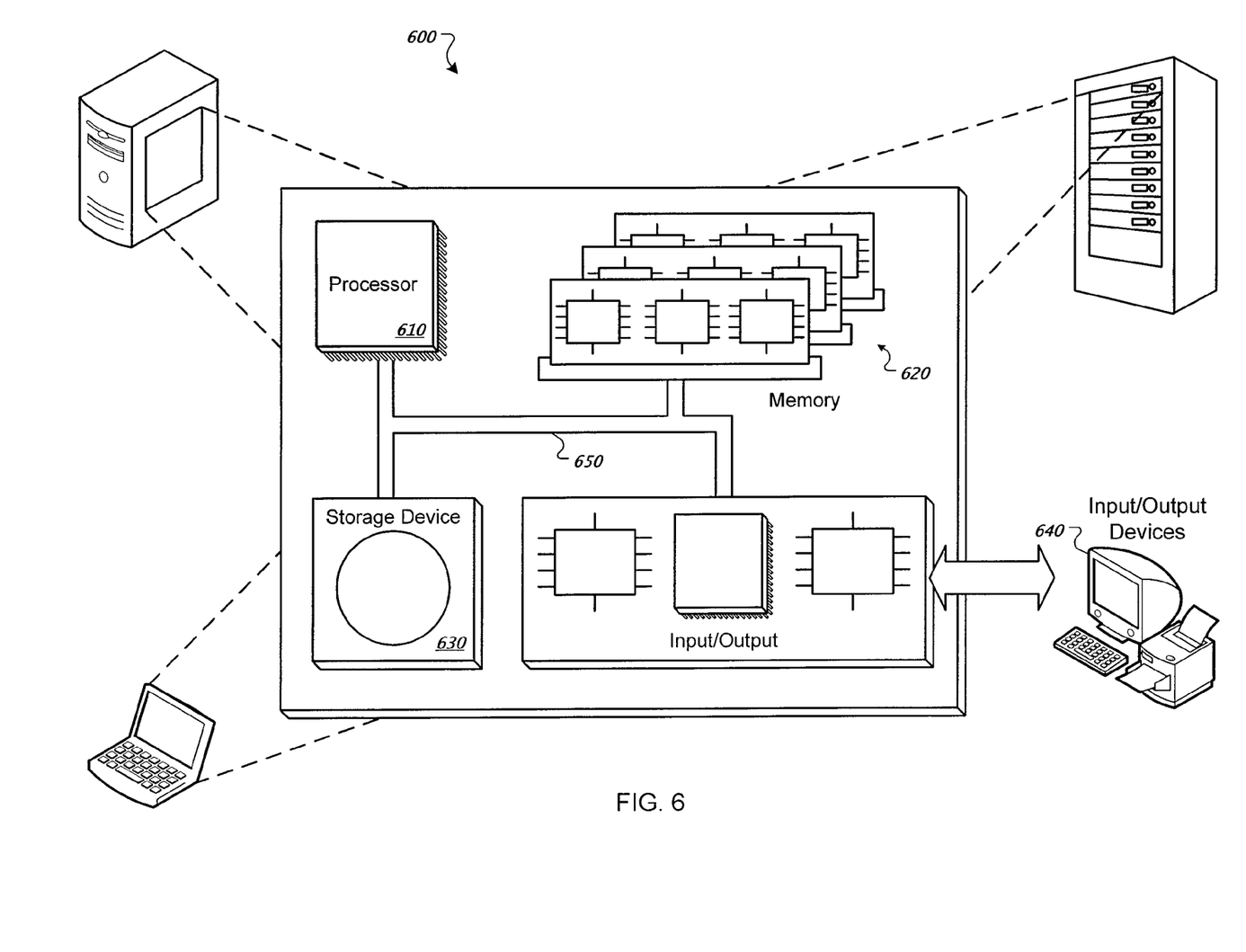
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for determining a value for an indicator, the method comprising:
   identifying, using a computer system, an indicator for which a value is to be determined;
   identifying, using the computer system, parameters to be used in determining a specific time interval for determining the value, the identified parameters including at least:
   (i) a first offset parameter defining a time offset from a reference time point that is expressed in a time unit;
   (ii) a second offset parameter defining a time offset from a first time point determined using the first offset parameter, the second offset parameter configured to be expressed in one of the time unit and a superordinate time unit that is superordinate to the time unit; and
   (iii) a third offset parameter defining a time offset from a second time point determined using the second offset parameter;
   determining, using the computer system, the specific time interval using at least the identified parameters and the reference time point;
   determining, using the computer system, the value for the indicator using at least the determined specific time interval; and
   recording the determined value using the computer system.

2. The computer-implemented method of claim 1, wherein the indicator comprises a key performance indicator defined as a quantifiable factor of business performance, the determined value reflecting the business performance.

3. The computer-implemented method of claim 2, wherein the value is determined using an electronic report that is dynamically updated with business information.

4. The computer-implemented method of claim 2, further comprising:
   monitoring the key performance indicator by comparing the determined value with a reference value; and
   recording or outputting a result of the monitoring.

5. The computer-implemented method of claim 1, wherein the time unit and the superordinate time unit are selected from the group consisting of: a fraction of a second, a second, a minute, an hour, a day, a week, a month, a year, a decade, a century, a millennium, fiscal period, fiscal year and combinations thereof.

6. The computer-implemented method of claim 1, wherein at least one of the identified parameters is zero.

7. The computer-implemented method of claim 6, wherein the specific time interval is defined by end points, and wherein the end points are equal to each other and wherein the specific time interval comprises a single point in time.

8. The computer-implemented method of claim 1, further comprising:
   identifying a system date that is to be a basis for determining the value; and
   obtaining the reference time point by converting the system date to the time unit.

9. The computer-implemented method of claim 1, wherein the second offset parameter is expressed in the time unit, further comprising:
   determining the first time point by adjusting the reference time point using the first offset parameter;
   determining the second time point by adjusting the first time point using the second offset parameter; and
   determining a third time point by adjusting the second time point using the third offset parameter;
   wherein the specific time interval is determined using at least the determined first, second and third time points.

10. The computer-implemented method of claim 9, wherein the specific time interval is defined by end points, further comprising:
    determining the first, second and third time points for each of the end points, wherein at least one of the first, second and third offset parameters is different compared to the determination for the other end point;
    wherein the specific time interval is determined using at least the determined first, second and third time points for each of the end points.

11. The computer-implemented method of claim 1, wherein the second offset parameter is expressed in the superordinate time unit and wherein the identified parameters includes also an index parameter defining a value for the time unit relative to the superordinate time unit, further comprising:
    determining the first time point by adjusting the reference time point using the first offset parameter;
    converting the determined first time point from the time unit to the superordinate time unit;
    determining the second time point expressed in the superordinate time unit by adjusting the first time point expressed in the superordinate time unit using the second offset parameter;
    determining the second time point expressed in the time unit by adjusting the second time point expressed in the superordinate time unit using the index parameter;
    determining a third time point by adjusting the determined second time point expressed in the time unit using the third offset parameter;
    wherein the specific time interval is determined using at least the determined first, second and third time points.

12. The computer-implemented method of claim 11, wherein the specific time interval is defined by end points, further comprising:
    determining the first, second and third time points for each of the end points;
    wherein the specific time interval is determined using at least the determined first, second and third time points for each of the end points.

13. A computer program product tangibly embodied in a non-transitory computer-readable storage medium and comprising instructions that when executed by a processor perform a method for determining a value for an indicator, the method comprising:
- identifying an indicator for which a value is to be determined;
- identifying parameters to be used in determining a specific time interval for determining the value, the identified parameters including at least:
  (i) a first offset parameter defining a time offset from a reference time point that is expressed in a time unit;
  (ii) a second offset parameter defining a time offset from a first time point determined using the first offset parameter, the second offset parameter configured to be expressed in one of the time unit and a superordinate time unit that is superordinate to the time unit; and
  (iii) a third offset parameter defining a time offset from a second time point determined using the second offset parameter;
- determining the specific time interval using at least the identified parameters and the reference time point;
- determining the value for the indicator using at least the determined specific time interval; and
- recording the determined value.

14. A computer-implemented method for creating an indicator, the method comprising:
- storing a definition of an indicator using a computer system, the definition specifying how to determine a value for the indicator using a specific time interval;
- storing, using the computer system and in association with the definition, parameters to be used in determining the specific time interval, the stored parameters including at least:
  (i) a first offset parameter defining a time offset from a reference time point that is expressed in a time unit;
  (ii) a second offset parameter defining a time offset from a first time point determined using the first offset parameter, the second offset parameter configured to be expressed in one of the time unit and a superordinate time unit that is superordinate to the time unit; and
  (iii) a third offset parameter defining a time offset from a second time point determined using the second offset parameter; and
- implementing, using the computer system, the indicator for evaluation such that upon the evaluation the specific time interval is determined using at least the stored parameters and the reference time point, and the value for the indicator is determined according to the definition using at least the determined specific time interval.

15. The computer-implemented method of claim 14, wherein the stored parameters further include:
  (iv) an index parameter defining a value for the time unit relative to the superordinate time unit, the index parameter configured for use in determining the second time point expressed in the time unit by adjusting the second time point expressed in the superordinate time unit.

16. The computer-implemented method of claim 14, wherein the indicator comprises a key performance indicator defined as a quantifiable factor of business performance, the value to reflect the business performance, further comprising:
- providing, before the definition is associated with the stored parameters, a user-selectable input control wherein a user involved in implementing the indicator can choose between respective sets of stored parameters;
- receiving a user input made using the input control, the user input indicating that the user selects the stored parameters among the sets of stored parameters; and
- generating the association between the selected stored parameters and the definition using the received user input.

17. A computer program product tangibly embodied in a non-transitory computer-readable storage medium and comprising instructions that when executed by a processor perform a method for defining an indicator, the method comprising:
- storing a definition of an indicator, the definition specifying how to determine a value for the indicator using a specific time interval;
- storing, in association with the definition, parameters to be used in determining the specific time interval, the stored parameters including at least:
  (i) a first offset parameter defining a time offset from a reference time point that is expressed in a time unit;
  (ii) a second offset parameter defining a time offset from a first time point determined using the first offset parameter, the second offset parameter configured to be expressed in one of the time unit and a superordinate time unit that is superordinate to the time unit; and
  (iii) a third offset parameter defining a time offset from a second time point determined using the second offset parameter; and
- implementing the indicator for evaluation such that upon the evaluation the specific time interval is determined using at least the stored parameters and the reference time point, and the value for the indicator is determined according to the definition using at least the determined specific time interval.

* * * * *